United States Patent
Halsema

(10) Patent No.: US 7,580,146 B2
(45) Date of Patent: Aug. 25, 2009

(54) HIERARCHICAL ARCHITECTURE FOR A DISTRIBUTED AND SCALABLE NETWORK PRINTING SYSTEM

(75) Inventor: Aillil Ian Halsema, Los Angeles, CA (US)

(73) Assignee: Xerox Corporation, Stamford, CT (US)

( * ) Notice: Subject to any disclaimer, the term of this patent is extended or adjusted under 35 U.S.C. 154(b) by 881 days.

(21) Appl. No.: 11/087,004

(22) Filed: Mar. 22, 2005

(65) Prior Publication Data

US 2006/0215214 A1    Sep. 28, 2006

(51) Int. Cl.
*G06F 3/12* (2006.01)
(52) U.S. Cl. .................. 358/1.15; 358/1.1; 358/1.13
(58) Field of Classification Search ............. 358/1.13, 358/1.15
See application file for complete search history.

(56) References Cited

U.S. PATENT DOCUMENTS

| 4,680,753 A | 7/1987 | Fulton et al. |
| 5,689,642 A | 11/1997 | Harkins et al. |
| 5,901,067 A | 5/1999 | Kao et al. |
| 6,587,953 B1 | 7/2003 | Torikai |
| 7,047,088 B2* | 5/2006 | Nakamura et al. ............. 700/19 |
| 2004/0156064 A1* | 8/2004 | Owen et al. ................. 358/1.13 |
| 2004/0158654 A1* | 8/2004 | Shima ........................... 710/8 |

* cited by examiner

*Primary Examiner*—Mark K Zimmerman
*Assistant Examiner*—Kent Yip
(74) *Attorney, Agent, or Firm*—Carter, DeLuca, Farrell & Schmidt, LLP

(57) ABSTRACT

A hierarchical architecture for a network printing system having a plurality of electronic printers and printing systems is provided. The hierarchical architecture decomposes each electronic printer and printing system's Digital Front End (DFE) and print engine into a hierarchical set of networked printer components communicating via a many-to-many network protocol. Print data is routed from component-to-component based on the receiving component's self-advertised function and availability. Adding duplicate printer components to the network environment scales or increases the reliability and performance of the network environment. A sufficiently large set of inexpensive printer components may be configured to achieve any desired level of reliability and performance through redundancy. Additionally, a network of DFE printer components (input and output spoolers, and RIP processors) can control multiple print engine components, improving the prior art 1:1 ratio between print engine components and DFE components.

17 Claims, 2 Drawing Sheets

HIERARCHICAL ARCHITECTURE FOR A DISTRIBUTED AND SCALABLE NETWORK PRINTING SYSTEM

BACKGROUND

The present disclosure relates to electronic printers and printing systems, and more particularly, to a hierarchical architecture for a distributed and scalable network printing system.

A network environment generally includes many electronic printers and printing systems. Each electronic printer and printing system can be referred to as an electronic printing system (EPS). In order to increase the reliability and performance of the network environment, typically, slower electronic printers and printing systems are replaced with faster, and perhaps, much larger, electronic printers and printing systems. Once replaced, the slower electronic printers and printing systems do not contribute to the network environments's overall reliability and performance.

Additionally, in the network environment, it is typical that some of the electronic printers and printing systems are overloaded which lead to processing delays, while other electronic printers and printing systems are underused which presents an inefficient use of the network environment's resources. The network environment does not have a mechanism for routing print data from one electronic printer or printing system to another to facilitate quicker processing of the print data.

It is an aspect of the present disclosure to provide a hierarchical architecture for a distributed and scalable network printing system which overcomes the drawbacks in the prior art.

It is another aspect of the present disclosure to provide a hierarchical architecture having a hierarchical set of networked printer components for a distributed and scalable network printing system.

It is still another aspect of the present disclosure to provide a hierarchical architecture for a distributed and scalable network printing system for increasing the reliability and performance of a network environment through redundancy of networked printer components.

SUMMARY

According to the present disclosure, a hierarchical architecture is provided for a distributed and scalable network printing system which overcomes the drawbacks in the prior art. The hierarchical architecture includes a hierarchical set of networked printer components which can be duplicated in a network environment for scaling or increasing the reliability and performance of the network environment.

In particular, the hierarchical architecture according to the present disclosure entails decomposing each EPS's, i.e., each electronic printer and printing system's, Digital Front End (DFE) and print engine into a hierarchical set of networked printer components communicating via a many-to-many network protocol in a network environment. Print data is routed from component-to-component based on the receiving component's self-advertised function and availability. This methodology prevents overloading the networked printer components of electronic printers and printing systems of the network environment while underusing other networked printer components. Adding duplicate printer components to the network environment in accordance with the present disclosure scales or increases the reliability and performance of the network environment.

In accordance with the hierarchical architecture of the present disclosure, a sufficiently large set of inexpensive printer components may be configured to achieve any desired level of reliability and performance through redundancy. Additionally, a network of DFE printer components (input spoolers, raster image processors and output spoolers) can control multiple print engine components, improving the prior art 1:1 ratio between print engine components and DFE components.

In one embodiment of the present disclosure a hierarchical network printing system includes a plurality of printer components organized in a multi-level hierarchy in operative communication via a network and at least one processor for executing application software for determining at least one available printer component from the plurality of printer components for routing print data thereto via the network. The print data are routed unidirectionally via the network from higher-level printer components of the multi-level hierarchy to lower-level printer components of the multi-level hierarchy.

The present disclosure further provides a method for routing print data in a network printing system. The method includes providing a hierarchical set of networked printer components in operative communication via a network; processing at least one data packet transmitted by at least one of the hierarchical set of networked printer components for determining at least one available printer component of the hierarchical set of networked printer components; and routing the print data via the network to the at least one available printer component of the hierarchical set of networked printer components. The print data are routed unidirectionally via the network from higher-level printer components of the hierarchical set of networked printer components to lower-level printer components of the hierarchical set of networked printer components.

The present disclosure further provides a data signal having at least one data packet having a plurality of fields including a field indicating the position of at least one of a plurality of printer components in a multi-level hierarchy of the plurality of printer components, a field indicating the available capacity of the at least one of the plurality of printer components, and a field indicating a network address of the at least one of the plurality of printer components.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

The present disclosure provides a hierarchical architecture for a distributed and scalable network printing system composed of a heterogeneous collection of networked printer components that reside within a network environment and are self-organized into a multi-level hierarchy. The word "architecture" refers, for example, to the manner in which the networked printer components of the network printing system are organized and integrated. The heterogeneous collection of networked printer components includes (listed in order from highest to lowest) input spoolers, raster image processors (RIP processors), output spoolers and print engines. The input spoolers, RIP processors and output spoolers are part of an EPS's, i.e., electronic printer's or printing system's, Digital Front End (DFE). The networked printer components may be physically separate with respect to each other and connected to a common network of the network environment.

In the hierarchical architecture in accordance with the present disclosure, there may be any number of each networked printer component communicating according to the following two rules: higher-level networked printer components locate networked printer components in the next lower level; and lower-level networked printer components have no knowledge of the higher-level networked printer components.

In operation of the network printing system having the hierarchical architecture in accordance with the present disclosure, as each networked printer component is started, it broadcasts a message advertising its type and existence and then broadcasts a request for information about those networked printer components in the level below it. When data is to be printed, the data are routed unidirectionally via the network from a higher-level networked printer component to a lower-level networked printer component, with the routing being dynamically determined by the higher-level networked printer component.

Routing is dynamic and may be based on any desired criteria, such as service type, capacity of the receiving networked printer component, and status of the receiving networked printer component. Networked printer components can be added (or removed) from the network environment dynamically to scale performance and reliability of the network environment.

Figure 1:
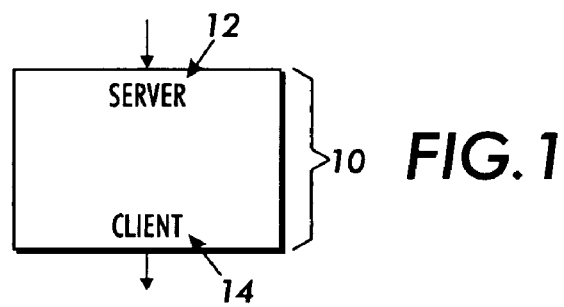
FIG. 1 is a block diagram of an individual, higher-level networked printer component within the hierarchical architecture in accordance with the present disclosure.

With reference to FIG. 1, there is shown a block diagram of an individual, higher-level, networked printer component designated generally by reference numeral 10. Each individual, higher-level, networked printer component 10 within the multi-level hierarchy includes a server interface 12 for interfacing with higher-level networked printer components in the hierarchical architecture and a client interface 14 for interfacing with lower-level networked printer components 16. The lowest level networked printer component 16, i.e., the print engine, does not include a client interface 14 (see FIG. 2).

The server and client interfaces 12, 14 enable communications between the network printer components in the hierarchical architecture. In particular, the server and client interfaces 12, 14 allow for server and client connections for enabling discovery and communications with networked printer components providing and accepting print data, respectively.

An exemplary distributed multi-level network printing system 100 having a hierarchical architecture 18 in accordance with the present disclosure which is composed of redundant DFE networked printer components (input spoolers 20A, 20B; RIP processors 22A, 22B; and output spoolers 24A, 24B) capable of driving three print engines (26A, 26B, 26C) is illustrated by the block diagram of FIG. 2. All the printer components reside within a common network 28 of the network printing system 100. The networked printer components can be configured for wired or wireless communications with the other networked printer components in the network 28 via a many-to-many network protocol, such as IEEE 802.11, Bluetooth, and TCP/IP.

Each higher-level, networked printer component 10 has access to routing information to its immediate inferior or lower-level networked printer components of the multi-level hierarchy. A failed printer component does not impede operation of the network printing system 100, if there are one or more peers that its superior(s) can route print data to instead. For example, if the networked printer component 22B in FIG. 2 fails, its superior or higher-level networked printer components 20A, 20B can route print data to networked printer component 22A.

Figure 2:
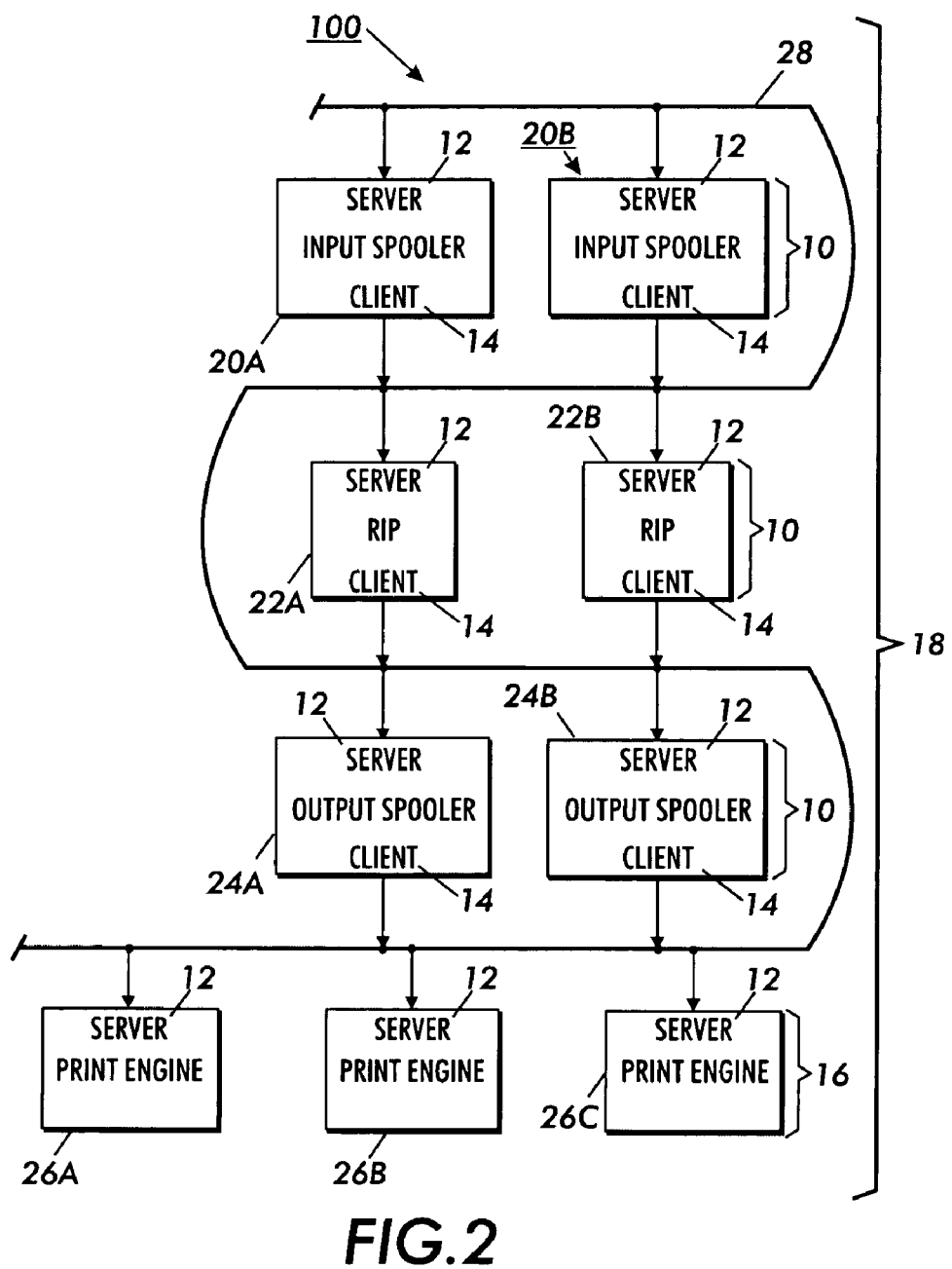
FIG. 2 is a block diagram of an exemplary distributed and scalable network printing system having the hierarchical architecture according to the present disclosure.

As each networked printer component 10, 16 in FIG. 2 is started, it advertises itself by sending an Unreliable Delivery Protocol (UDP) request packet containing its type, currently available capacity, and IP address (or other type of address according to the network protocol being used). This request packet data is resent when the networked printer component 10, 16 receives a UDP query packet, or when the networked printer component receives a service advertisement packet 30 (see FIG. 3) from an immediate superior or higher-level printer component of the multi-level hierarchy.

Figure 3:
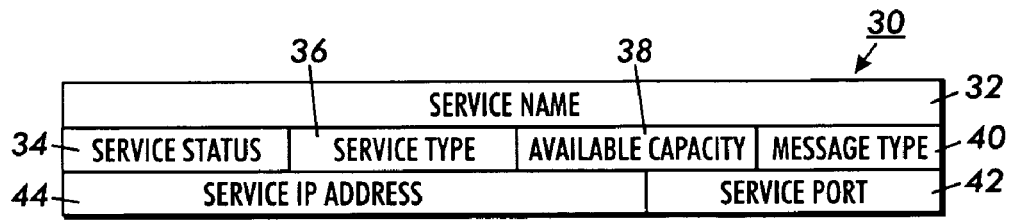
FIG. 3 is a schematic illustration of an exemplary service advertisement packet capable of being broadcast by a networked printer component of the hierarchical architecture in accordance with the present disclosure.

FIG. 3 schematically illustrates an exemplary service advertisement packet 30 capable of being broadcast by a networked printer component 10, 16 of the hierarchical architecture 18 in accordance with the present disclosure. The service advertisement packet 30 is generated and broadcast when a networked printer component 10, 16 is started, and when it receives a service advertisement packet 30 from an immediate, higher-level networked printer component.

The service advertisement packet 30 corresponding to each printer component is generated by one or more processors corresponding to the printer component. The one or more processors execute application software having a set of programmable instructions for generating the service advertisement packets 30.

The application software further includes additional programmable instructions capable of being executed by the one or more processors for performing other functions respective of each printer component, such as printing functions, and other functions in accordance with the present disclosure, such as decomposing the DFE components and print engines into the hierarchical set of networked printer components 10, 16; interfacing each networked printer component 10, 16 with at least one of a higher- and lower-level printer component 10, 16 of the multi-level hierarchy; receiving and processing print data routed through the multi-level hierarchy; and communicating with other networked printer components 10, 16 according to the two rules mentioned above and other considerations/parameters set forth by an operator of the hierarchical architecture 18.

The application software is preferably stored within the one or more processors. It is contemplated that the application software is stored in a computer-readable medium, such as a CD-ROM, DVD, 3.5" diskette, etc.

With reference to FIG. 3, a preferred service advertisement packet 30 propagated as a data signal via the network 28 accordance with the present disclosure includes a service name field 32 which contains a 32-byte ASCII string identifying the service. Some services are input spooling, RIP processing, output spooling, and operating the print engine. The service status field 34 describes the printer component's status (i.e., idle, busy, off, etc.). The service type field 36 identifies the printer component's position in the multi-level hierarchy where the highest level's type value is 1 and the lowest level's type value is any value greater than 1. The available capacity field 38 is a normalized metric used for selecting the least loaded printer component in a set of the same type. The message type field 40 identifies the packet as generated during printer component startup, or in response to a higher-level printer component's request. The service port field 42 and service IP address field 44 (or other type of address according to the network protocol being used) are provided to enable direct transmission of print data from a higher-level networked printer component.

Figure 4:
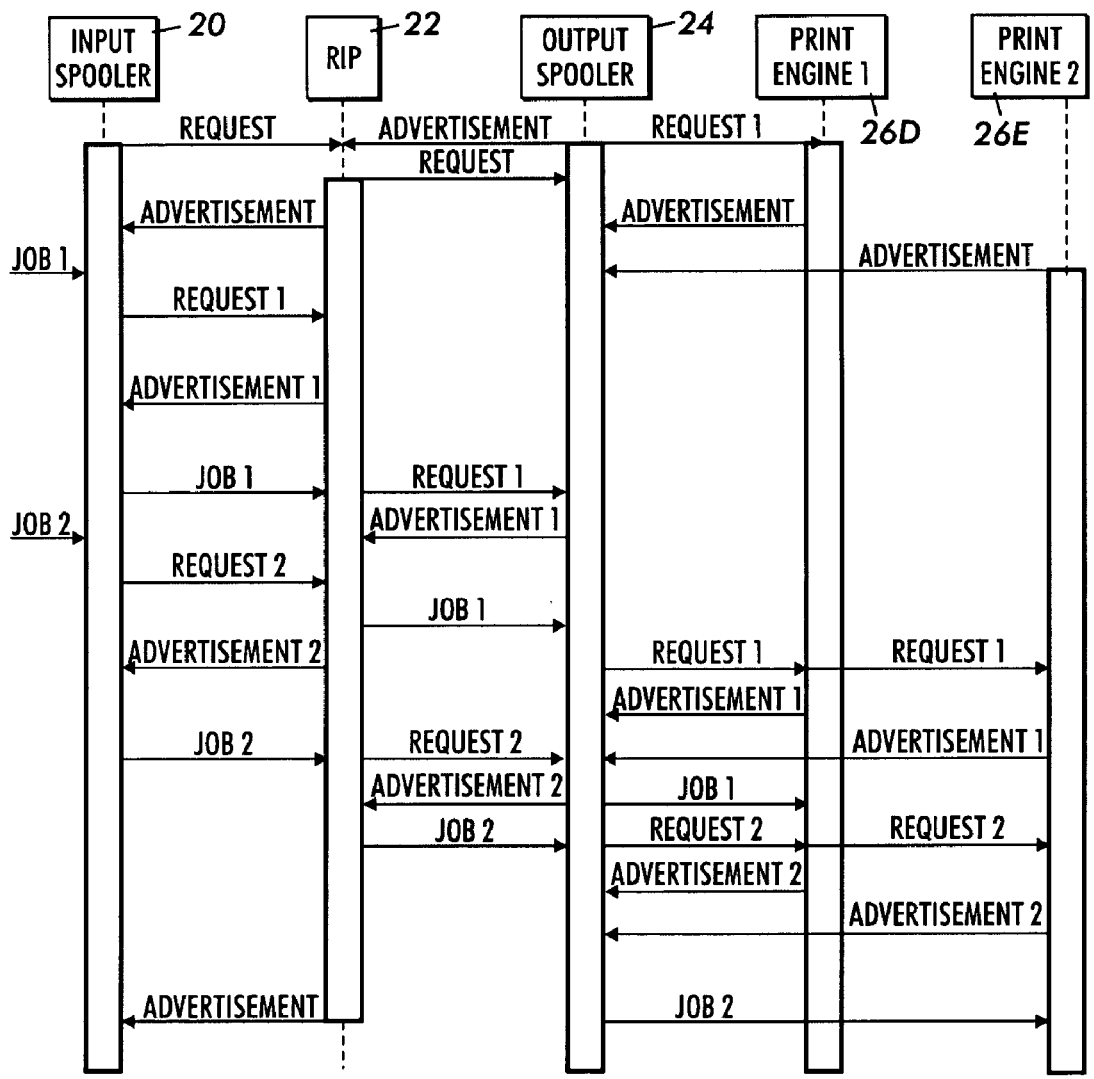
FIG. 4 is a schematic illustration showing the interaction between networked printer components in the hierarchical architecture when receiving and printing two print jobs in accordance with the present disclosure.

FIG. 4 schematically illustrates the interaction between networked printer components 10, 16 in the hierarchical architecture 18 when receiving and printing two print jobs in accordance with the present disclosure. As shown in FIG. 4, a set of non-redundant DFE printer components 10 drive a pair of print engines 26 with two print jobs. At the top of the diagram, an input spooler 20 starts up before the RIP processor 22 and accordingly the input spooler 20 gets no response to its broadcast startup request packet for information about networked printer components 10, 16 at the level below its level. The RIP processor 22 broadcasts its service advertisement packet 30 and a startup request packet when it starts up, and accordingly the input spooler 20 has a route to its inferior or lower-level printer component of the multi-level hierarchy. The startup request packet is the same as that shown in FIG. 3, but the message type field 40 identifies the packet as generated during printer component startup.

The output spooler 24 has two print engines 26D, 26E below it, where print engine 26D responds to its startup request. The second print engine 26E starts later and broadcasts its service advertisement packet 30 at that time. In this manner, all of the networked printer components 10, 16 of the multi-level hierarchy obtain or send the required routing information.

When the first print job is available at the input spooler 20, the input spooler 20 requests the status of the RIP processor(s) 22 below it. Upon the input spooler 20 receiving an appropriate response, the print job is passed to it for processing. The RIP processor 22 interacts with the output spooler 24 in the same manner. The output spooler 24 requests the status of the print engines 26D, 26E below it and subsequently determines that the first print engine 26D is busy but the second print engine 26E is idle. Accordingly, the output spooler 24 routes the second print job to the second print engine 26E. Finally, the RIP processor 22 shuts down and broadcasts a final service advertisement packet 30 containing the appropriate status in the service status field 34.

The result of the interactions between the various networked printer components are two print jobs printed (or printing), the input spooler 20 unable to release print jobs for printing (but still spooling), the RIP processor 22 shut down, and the output spooler 24 on and sending job data to the print engine(s) 26D, 26E. Any of the networked printer components of the multi-level hierarchy can be duplicated (or replaced with faster components) to increase the capacity of the network printing system 100.

In conclusion, the hierarchical architecture for a network printing system in accordance with the present disclosure decomposes each EPS's, i.e., each electronic printer and printing system's, DFE and print engine into a hierarchical set of networked printer components communicating via a many-to-many network protocol. Print data is routed from component-to-component based on the receiving component's self-advertised function and availability. This methodology prevents overloading the networked printer components of electronic printers and printing systems of the network environment while underusing other networked printer components. Adding duplicate printer components to the network environment scales or increases the reliability and performance of the network environment. A sufficiently large set of inexpensive printer components may be configured to achieve any desired level of reliability and performance through redundancy. Additionally, a network of DFE printer components (input and output spoolers, and RIP processors) can control multiple print engine components, improving the prior art 1:1 ratio between print engine components and DFE components.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A hierarchical network printing system, comprising:
a plurality of printer components organized in a multi-level hierarchy in operative communication via a network, wherein the plurality of printer components are selected from a group consisting of input spoolers, RIP processors, output spoolers, and print engines; and
at least one processor for executing application software for determining at least one available printer component from the plurality of printer components for routing print data thereto via the network, where print data are routed unidirectionally via the network from higher-level printer components of the multi-level hierarchy to lower-level printer components of the multi-level hierarchy, wherein each level in the multi-level hierarchy includes one or more redundant printer components for allowing the printing system to selectively determine the at least one available printer at the each level.

2. The hierarchical network printing system according to claim 1, wherein execution of the application software by the at least one processor generates at least one data packet corresponding to at least one of said plurality of printer components.

3. The hierarchical network printing system according to claim 2, wherein said at least one data packet includes a plurality of fields, and wherein the at least one available printer component is determined by processing the at least one data packet by at least one of the plurality of printer components in the multi-level hierarchy.

4. The hierarchical network printing system according to claim 3, wherein the plurality of fields include a field indicating the position of the at least one of said plurality of printer components in the multi-level hierarchy, a field indicating the available capacity of the at least one of said plurality of printer components, and a field indicating a network address of the at least one of said plurality of printer components.

5. The hierarchical network printing system according to claim 1, wherein each of said plurality of printer components includes a server interface for interfacing and communicating with a higher-level printer component of the plurality of printer components, and wherein each of said plurality of printer components, other than the lowest printer components of the multi-level hierarchy, includes a client interface for interfacing and communicating with a lower-level printer component of the plurality of printer components.

6. The hierarchical network printing system according to claim 1, wherein each of said plurality of printer components is configured to communicate according to two rules: higher-level networked printer components locate networked printer components in the next lower level; and lower-level networked printer components have no knowledge of the higher-level networked printer components.

7. A method for routing print data in a network printing system, said method comprising:
enabling a multi-leveled hierarchical set of networked printer components to operatively communicate via a network, wherein the multi-leveled hierarchical set of networked printer components is selected from a group consisting of input spoolers, RIP processors, output spoolers, and print engines;
processing at least one data packet transmitted by at least one of the multi-leveled hierarchical set of networked printer components for determining at least one available printer component of the hierarchical set of networked printer components; and
routing said print data via the network to the at least one available printer component of the hierarchical set of networked printer components, where said print data are routed unidirectionally via the network from higher-level printer components of the hierarchical set of networked printer components to lower-level printer components of the hierarchical set of networked printer components, wherein each level in the multi-leveled hierarchy includes one or more redundant printer components for allowing the printing system to selectively determine the at least one available printer at the each level.

8. The method according to claim 7, wherein enabling a multi-leveled hierarchical set of networked printer components in operative communication via a network includes decomposing each Digital Front End (DFE) and print engine into the hierarchical set of networked printer components.

9. The method according to claim 7, further comprising generating said at least one data packet by the at least one of the hierarchical set of networked printer components.

10. The method according to claim 9, wherein said at least one data packet includes a plurality of fields; including a field indicating the position of the at least one of the hierarchical set of networked printer components, a field indicating the available capacity of the at least one of the hierarchical set of networked printer components, and a field indicating a network address of the at least one of the hierarchical set of networked printer components.

11. The method according to claim 7, further comprising adding networked printer components for increasing the capacity of the network printing system.

12. The method according to claim 7, further comprising controlling multiple lower-level printer components of the hierarchical set of networked printer components by a higher-level printer component of the hierarchical set of networked printer components.

13. The method according to claim 7, further comprising providing an interface for each of the networked printer components of the hierarchical set of networked printer components for interfacing and communicating with a higher-level networked printer component of the hierarchical set of networked printer components.

14. The method according to claim 7, further comprising providing an interface for each of the networked printer components of the hierarchical set of networked printer components, other than the lowest networked printer component of the hierarchical set of networked printer components, for interfacing and communicating with a lower-level networked printer component of the hierarchical set of networked printer components.

15. A data transmission device comprising a data transmission means for transmitting at least one data packet having a plurality of fields including a field indicating the position of at least one of a plurality of printer components in a multi-level hierarchy of the plurality of printer components of a printing system, wherein the plurality of printer components are selected from a group consisting of input spoolers, RIP processors, output spoolers, and print engines, a field indicating the available capacity of the at least one of said plurality of printer components, and a field indicating a network address of the at least one of said plurality of printer components, wherein each level in the multi-level hierarchy includes one or more redundant printer components for allowing the printing system to selectively determine at least one available printer at the each level.

16. The data transmission device according to claim 15, wherein each of said plurality of printer components includes an interface for receiving the at least one data packet.

17. The data transmission device according to claim 15, wherein the device comprises a generation means for generating the at least one data packet when the at least one of the plurality of printer components is started and when the at least one of the plurality of printer components receives a data packet.

* * * * *